United States Patent
Randolph

[15] 3,676,476
[45] July 11, 1972

[54] METHOD FOR PREPARING TRIVALENT AND PENTAVALENT ANTIMONY ESTERS OF POLYHYDROXY COMPOUNDS

[72] Inventor: Michael J. Randolph, Wilmington, Del.
[73] Assignee: E. I. du Pont de Nemours and Company, Wilmington, Del.
[22] Filed: Nov. 30, 1970
[21] Appl. No.: 93,833

[52] U.S. Cl. ............................................260/446, 252/8.1
[51] Int. Cl. .........................................................C07f 9/90
[58] Field of Search.................................................260/446

[56] References Cited

UNITED STATES PATENTS

| | | | |
|---|---|---|---|
| 2,993,924 | 7/1961 | Marks et al. | 260/446 |
| 3,035,076 | 5/1962 | Gailliot et al. | 260/446 |
| 3,109,853 | 11/1963 | Worsley et al. | 260/446 |
| 3,288,830 | 11/1966 | Stallings et al. | 260/446 |
| 3,437,591 | 4/1969 | Bungs | 260/446 |
| 3,455,995 | 7/1969 | Bowman et al. | 260/446 |
| 3,440,259 | 4/1969 | Bungs | 260/446 |

*Primary Examiner*—Tobias E. Levow
*Assistant Examiner*—Werten F. W. Bellamy
*Attorney*—Don M. Kerr

[57] ABSTRACT

A method for the preparation of esters of pentavalent antimony and mixed esters of trivalent antimony and pentavalent antimony with polyhydroxy compounds having vicinal hydroxy groups in solutions of the polyhydroxy compounds or other polar organic solvents, which comprises (1) oxidizing antimony trioxide with aqueous nitric acid in presence of hydrochloric acid to provide pentavalent antimony oxide and hydroxide or mixed trivalent and pentavalent antimony oxides and hydroxides, (2) adding the oxides and hydroxides to an excess of the polyhydroxy compound and heating to cause the components to react while simultaneously distilling under reduced pressure to remove water of reaction, and optionally (3) removing the bulk of the excess unreacted polyhydroxy compound by continued distillation to form a slurry of the ester or mixed esters in the remaining polyhydroxy compound, and either recovering the crystallized pentavalent antimony ester or dissolving the slurry in another polar organic solvent. The solutions are used to incorporate antimony into organic polymers to provide flame resistance.

18 Claims, No Drawings

METHOD FOR PREPARING TRIVALENT AND PENTAVALENT ANTIMONY ESTERS OF POLYHYDROXY COMPOUNDS

BACKGROUND OF THE INVENTION

Glycerine and glycol esters of trivalent antimony are known. Such compounds have been incorporated into polymers to give improved flame resistance. These compounds, however, are not sufficiently soluble in the polar organic solvents commonly used to dissolve polymers for casting or spinning, and therefore cannot conveniently be incorporated into films, foams, or fibers of the polymers.

SUMMARY OF THE INVENTION

This invention relates to a process for preparing esters of antimony with polyhydroxy compounds containing vicinal hydroxyl groups, such as glycerine and glycol. The esters are soluble in the polar organic solvent commonly used to dissolve polymers, in spite of the fact that a portion of the antimony may be in the trivalent state. The invention therefore provides antimony compounds which can be conveniently incorporated into organic polymers to provide flame retardancy.

The invention comprises a novel process for making esters of pentavalent antimony or mixed esters of trivalent antimony and pentavalent antimony with a polyhydroxy compound containing between two and six carbon atoms, inclusive, and having vicinal hydroxyl groups. The process involves the steps: (1) oxidizing antimony trioxide with aqueous nitric acid in the presence of hydrochloric acid to form a product composed of pentavalent antimony oxide and hydroxide or mixed trivalent and pentavalent antimony oxides and hydroxides; (2) mixing said product with an excess of a polyhydroxy compound of the type specified above and heating the mixture to cause the oxides and hydroxides to react with a portion of the polyhydroxy compound, with simultaneous removal of of the water liberated in reaction by distillation under reduced pressure, thus forming the ester or mixed esters in a solution of the polyhydroxy compound; (3) continuing the reduced pressure distillation to remove the bulk of the polyhydroxy compound and form a slurry of the ester or mixed esters in the remaining polyhydroxy compound; and either (4) recovering the pentavalent antimony ester by crystallization from the slurry, or (5) mixing the slurry with a polar organic solvent to form a clear solution of the ester or mixed esters. The solutions obtained by steps 1 and 2 above are useful for incorporating the antimony esters into polymers such as polyesters which are soluble in the polyhydroxy compounds at high tempeature. Steps 3, 4 and 5 are optional, and are performed when it is desired to recover the pentavalent antimony ester as a solid product which can be dissolved in a polar solvent or when it is desired to transfer the esters into a liquid which is a solvent for other types of polymers.

DESCRIPTION OF THE INVENTION

The first step in the process involves oxidizing antimony trioxide with aqueous nitric acid in the presence of hydrochloric acid to produce pentavalent antimony oxide or hydroxide or mixed trivalent and pentavalent antimony oxides or hydroxides. The rate of conversion of trivalent antimony to pentavalent antimony depends on the concentrations and proportions of hydrochloric and nitric acid used, and the temperature at which the reaction is run. Higher temperatures in the range of 25° to 122° C. and lower 70 percent nitric acid to 37 percent hydrochloric acid weight ratios in the range of 2:1 to 200:1 increase the rates of reaction. Reaction times are shortened if a 25 percent or more excess of nitric acid is used over the 4:1 mole ratio of nitric acid to antimony trioxide required to oxidize all the trivalent antimony to pentavalent antimony. It is also desirable to have a weight ratio of greater than 3:1 of the solution containing the mixed acids to antimony oxide so that the slurry can be stirred effectively.

If no hydrochloric acid is used, the pentavalent antimony oxides and hydroxides formed in the oxidation reaction will react very slowly with the polyhydroxy compound. If too large an amount of hydrochloric acid is used, it will be difficult to remove the acid from the antimony oxides and hydroxides prior to reacting them with the polyhydroxy compound. Because of these limitations, it is best to have a weight ratio of 70 percent nitric acid to 37 percent hydrochloric acid, within the limits of 200:1 and 2:1, preferably between 50:1 and 10:1. The temperature can range from 25° C. to the boiling point of the solutions, or about 122° C. The reaction proceeds faster at the higher temperatures, but the resulting antimony oxides and hydroxides are less reactive with the polyhydroxy compounds. The preferred range of temperature is 60° to 110° C. The residual hydrochloric acid along with some of the excess nitric acid are removed by distillation at the end of the reaction. The chloride content of the composition at this stage may be reduced to 0.1 percent, although the subsequent steps in the process can be carried out at higher chloride levels.

The resulting slurry is filtered and the wet cake is washed with water. If desired, the ratio of $Sb^{+3}$ to $Sb^{+5}$ can be adjusted at this point by adding either antimony trioxide or antimony pentahydroxide (the latter prepared by hydrolysis of antimony pentaethoxide) to the filter cake.

The second step of the process involves mixing the oxides and hydroxides prepared in the first step with an excess of a polyhydroxy compound and heating the mixture to a temperature in the range of 150° to 210° C., preferably from 160° to 180° C., to cause the oxides and hydroxides to react with the polyhydroxy compound. At a temperature of about 180° C. the pentavalent esters begin to decompose, yielding trivalent antimony compounds of an unidentified nature. At high temperatures, the rate of decomposition increases and above 210° C. the rate becomes quite rapid. At temperatures below 150° C., the rate of reaction of the antimony oxides and hydroxides with the polyhydroxy compounds is slow. Preferably water liberated in the reaction is continuously removed by distillation under reduced pressure as the reaction proceeds; if no water is removed the reaction will reach an equilibrium between the esters and hydroxides. Sufficient excess of polyhydroxy compound should be used so that the slurries of antimony oxides and hydroxides and the antimony ester can be handled conveniently. Examples of suitable polyhydroxy compounds, in addition to ethylene glycol and glycerol, already mentioned, are 1,2-propanediol, 1,2-butanediol and 2,3-butanediol. The preferred polyhydroxy compounds are those containing two, three, or four carbon atoms. Ethylene glycol and glycerol are the most preferred compounds.

The solutions obtained in the second step are useful for incorporating antimony into polymers which are soluble in the polyhydroxy compounds, e.g., polyesters, such as polyethylene terephthalate. For incorporating the antimony esters into other polymers, it is desirable to transfer them into other solvents which dissolve those polymers. In general the solvents which can be used are organic acids, amides, polyalcohols, and dimethylsulfoxide. Suitable solvents are characterized by a dielectric constant of the solvent measured at 25° C. and $10^4$ to $10^5$ cycles per second which exceeds 35 electrostatic units (ESU) and ratio of carbon atoms in the solvent to heteroatoms such as oxygen, nitrogen and sulfur, which is less than 1.7.

Suitable solvents include formic acid, formamide, methylformamide, dimethylformamide, acetamide, ethylene glycol, glycerol, diethylene glycol, propanediols such as 1,3-propanediol, and dimethylsulfoxide. Surprisingly it is found that a variety of other polar organic solvents which do not simultaneously satisfy these criteria in regard to the ratio of carbon to the heteroatoms and dielectric constant, are not good solvents for the esters of this invention. For example, such solvents as ethanol, methanol, tetramethylurea, dimethylacetamide, acetonitrile, acetic acid, furfural and methyl formate are not satisfactory solvents for the esters made by the process of the invention.

Solvents should be substantially anhydrous and contain not more than one percent water and preferably not more than 0.1 percent water. Free water, if present in substantial amounts, can cause hydrolysis of the esters of the invention or of the solvent in the presence of the acidic esters. This is particularly true of solvents such as formamide and methylformamide which hydrolyze easily in the presence of water and of acidic catalysts. In preparing the solutions of the esters of the invention in such solvents, it is therefore desirable to remove excess water by distillation, displacement with alcohols, or other suitable means, before mixing the esters with the solvent.

The most preferred solvents are those which are good solvents for organic polymers such as dimethylformamide and dimethylsulfoxide, which are excellent solvents for polyacrylonitrile and copolymers of acrylonitrile with vinyl and vinylidene halides. Also preferred are solvents for polyamide polymers such as 66 nylon, which includes formic acid, formamide, and mixtures of formamide with formic acid.

In order to transfer the esters into another solvent, the bulk of the polyhydroxy compound is removed by reduced pressure distillation, leaving a slurry of the esters in the remaining polyhydroxy compound. The second solvent is then added in an amount at least sufficient to dissolve all of the esters. Often it is desirable to add an excess of the second solvent and then distill under reduced pressure to remove a portion of the solvent along with the last traces of water.

If it is desired, a pure pentavalent antimony ester can be obtained by crystallization from the solutions obtained in the second step of the process. A solution containing 1 to 20 percent by weight of the desired compound dissolved in excess polyhydroxy compound is filtered to remove the unreacted antimony oxides and hydroxides. As the bulk of the polyhydroxy compound is removed by reduced pressure distillation, the pentavalent antimony ester preferentially crystallizes from the solution. The ratio of $Sb^{+5}$ to $Sb^{+3}$ must be greater than 2:1 if it is desired to recover a crystallized product; otherwise the pentavalent antimony ester will not crystallize, because the mixed esters are too soluble. Ratios of $Sb^{+5}$ to $Sb^{+3}$ of greater than 5:1 are preferred for crystallization.

The resulting slurry is filtered directly or, if desired, diluted with tetrahydrofuran to expedite filtration. The wet filter cake of pentavalent ester can also be washed with tetrahydrofuran to remove the mother liquor. Tetrahydrofuran has been found to be particularly satisfactory for these purposes, because the pentavalent antimony esters are not very soluble in the solvent and do not react with it, whereas the mixed trivalent antimony esters are soluble in tetrahydrofuran. Also the volatility of tetrahydrofuran (bp. 66° C.) facilitates drying of the product. Other solvents tried for this purpose such as methanol and acetone are unsatisfactory because they have a tendency to react with the pentavalent antimony esters.

When the crystalline product is prepared in this manner most of the residual chloride and nitrate remain in the mother liquor or washings, and the crystals contain no detectable nitrates and less than 0.01 percent chloride.

The structures of the products of the invention referred to herein as "mixed esters" are not known with certainty. The esters are thought to exist, at least in part, as cyclic esters in which the adjacent oxygen atoms on the vicinal hydroxyl groups form a five membered ring with the trivalent or pentavalent antimony. In the case of pentavalent antimony there can be one to three such five membered rings formed about the antimony atom and in the case of trivalent antimony one or two such rings. It is thought that the "mixed esters" are not mere physical mixtures of esters of trivalent antimony with esters of pentavalent antimony, since the products are quite soluble in various polar organic solvents in which glycol and glycerol esters of trivalent antimony are only slightly soluble at room temperature. Since the pentavalent antimony esters are acidic, and the trivalent antimony esters are relatively basic, the "mixed esters" may exist as salts which are more soluble than the polar organic solvents than are trivalent antimony esters alone. When esters of trivalent antimony are formed with polyhydroxy compounds, the possibility exists for the formation of polymers in which one hydroxyl of the polyhydroxy compound is esterified with a different trivalent antimony atom. In this manner bridges can be formed between two or more trivalent antimony atoms, and thus low molecular weight polymers of trivalent antimony may occur. Such polymeric species may then form salts with the acidic pentavalent antimony esters. Alternatively, or perhaps additionally, one or more antimony atoms in the polymeric structure may be in the pentavalent state.

In any case, regardless of the structure of the products, it has been found that the total amount of antimony which can be dissolved in a polar organic solvent depends on the ratio of $Sb^{+3}$ to $Sb^{+5}$. While it is possible to prepare soluble compositions having a mole ratio of $Sb^{+3}$ to $Sb^{+5}$ as high as 4:1 somewhat lower ratios are preferred because of their higher solubility. However, at ratios below about 0.3:1 the solubility decreases with increasing $Sb^{+5}$ content, although pure $Sb^{+5}$ esters are sufficiently soluble to give useful solutions.

Solutions made by the process of this invention can be mixed with polymer solutions in a compatible, preferably the same, solvent, then the polymer can be processed in the conventional manner to make shaped flame resistant articles. Examples of suitable polymers which are soluble in the solutions made by the process of the invention, are: acrylonitrile polymers such as polyacrylonitrile and copolymers of acrylonitrile with vinyl and vinylidene halides; polyamides; polyesters; polyurethanes; polyacrylates; vinyl chloride polymers such as polyvinyl chloride and copolymers of vinyl chloride with vinyl acetate; and acrylonitrile-butadiene-styrene copolymers. Thus the solutions can be used directly for solution-spinning of fibers or casting of films in the case of polymers such as polyacrylonitrile which are ordinarily processed in this manner. Foams can also be made from polymers such as polyurethane used in cushions or insulation. Alternatively, the solvent can be removed and the polymer can be melt extruded to form rods, pellets, fibers, or films, or molded to form other articles.

Same illustrative examples of the manner of carrying out this invention are given below. In the examples parts and percentages are by weight unless otherwise stated.

EXAMPLE 1

This example describes the preparation of a solution of antimony ethylene glycol esters in dimethylformamide, 80 percent of the antimony being in the pentavalent state and the remainder being trivalent antimony, by the nitric acid oxidation of antimony trioxide.

A 1 liter round bottom flask is equipped with mechanical stirrer, graduated dropping funnel, and distillation head. Five hundred grams of 70 percent nitric acid and 145.7 grams (0.5 mole) of antimony trioxide are charged to the flask. Twenty grams of 37 percent hydrochloric acid are added to the dropping funnel. The antimony trioxide slurry is then heated to 105° C., at which point oxides of nitrogen are evolved. To speed the reaction the hydrochloric acid is then added over a period of 1 hour. After the hydrochloric acid addition the mixture is held at 105° C. for one half hour and 100 grams of distillate consisting mainly of nitric acid and the residual hydrochloric acid are then removed. The resulting slurry is filtered and the solids are washed with 1,000 grams of water. The wet filter cake is a mixture of trivalent and pentavalent antimony hydroxides and oxides containing 0.25 percent of chloride ion.

The wet cake is charged to a flask along with 500 grams of ethylene glycol, stirred and heated to 180° C. The antimony oxides and hydroxides react with the ethylene glycol liberating water which is removed, together with excess ethylene glycol, by reduced pressure distillation. The distillate is removed at the rate of about 5 grams per minute and about 400 grams of a slurry of the antimony ethylene glycol ester in a small amount of ethylene glycol is obtained (80 to 90 minutes). One thousand grams of dimethylformamide and 10 grams of Filteraid are then added to the reaction product. The system is again evacuated to about 135 mm. of mercury pressure and the last traces of water are removed by distillation at 100° C., collecting about 50 grams of distillate. Finally, the solution is filtered to remove a small amount of unreacted antimony oxide. The product is a clear colorless solution of antimony ethylene glycol ester in dimethylformamide with a small amount of unreacted ethylene glycol present. By dissolving in HCl, adding potassium iodide and titrating the liberated iodine with sodium thiosulfate, over 80 percent of the antimony is found to be in the pentavalent state, the remainder being trivalent antimony. (Details of the analytical procedure are given in "Scotts Standard Methods of Chemical Analysis" published by D. Van Nostrand and Co., Inc., Princeton, New Jersey, pp. 75–76, 1939).

EXAMPLE 2

Antimony trioxide is oxidized with nitric acid as in Example 1. After the antimony oxides and hydroxides are recovered by filtration and washing, the wet filter cake is slurried with 700 grams of ethylene glycol. One hundred and two grams of antimony trioxide are added such that the ratio of trivalent to pentavalent antimony is 1 to 1.

The mixture is then stirred and heated to form the ester, which is then transferred to dimethylformamide as described in Example 1. This gives a clear colorless solution of antimony ethylene glycol ester with a trivalent to pentavalent antimony ratio of 1 to 1 containing a small amount of free ethylene glycol.

EXAMPLE 3

Antimony trioxide is oxidized with nitric acid as in Example 1. After the antimony oxides and hydroxides are recovered by filtration and washing, the wet filter cake is slurried with 1,500 grams of ethylene glycol. Three hundred and forty-eight grams of antimony trioxide are added such that the ratio trivalent to pentavalent antimony is 3 to 1.

The mixture is then stirred and heated to form the ester which is then transferred to dimethylformamide as described in Example 1. This gives a clear colorless solution of antimony ethylene glycol ester with a trivalent to pentavalent antimony ratio of 3 to 1 containing a small amount of free ethylene glycol.

EXAMPLE 4

This example describes the preparation of a crystalline pentavalent antimony ethylene glycol ester which contains three ethylene glycol units per antimony essentially free from nitrates, and containing less than 0.01 percent chloride. A wet filter cake containing a mixture of trivalent and pentavalent antimony hydroxide and oxide is prepared as in Example 1, using the same quantities of reactants. This cake is then reacted with 1,500 grams of ethylene glycol in a manner similar to that described in Example 1. The resulting solution of antimony ethylene glycol esters is filtered with 10 grams of Filteraid to remove any undissolved antimony oxide or hydroxide. The solution is vigorously stirred as the excess ethylene glycol is removed by distillation at a pressure of less than 5 Torr. As the glycol is removed, the desired compound crystallizes from the solution and the temperature of the slurry rises. When the temperature reaches 150° C., the distillation is stopped. One thousand grams of tetrahydrofuran is then added to the slurry containing the crystallized ester, so that it may be filtered more easily.

The filter cake is then washed with 300 grams of tetrahydrofuran and dried at room temperature under a stream of dry nitrogen.

When analyzed as in Example 1, the compound is found to contain 40.2 percent pentavalent antimony. When analyzed by atomic absorption, the material is found to contain 41 percent antimony (pentavalent and trivalent antimony combined), indicating that very little of the antimony is in the trivalent state. The analyzed antimony content is consistent with a compound having three ethylene glycoxide units per antimony, which, by calculation, contains 40.27 percent antimony. The material contains only 0.007 percent chloride, indicating the effectiveness of the crystallization step in removing chloride ion.

EXAMPLE 5

This example describes the preparation of a solution of antimony glycerol esters in dimethylformamide, 80 percent of the antimony being in the pentavalent state and the remainder being trivalent antimony. A wet cake prepared as described in Example 1 using the same quantities of reactants, is charged to a flask along with 1,000 grams of glycerol, stirred and heated to 160° C. The antimony oxides and hydroxides react with glycerol, liberating water which is removed together with excess glycerol by reduced pressure distillation, as described in Example 1. One thousand grams of dimethylsulfoxide and 10 grams of Filteraid are then added to the reaction product. The system is evacuated to about 130 Torr and the last traces of water are removed by distillation at 125° C., collecting about 100 grams of distillate. Finally the solution is filtered to remove a small amount of unreacted antimony oxide or hydroxide. The product is a clear, colorless solution of antimony glycerol ester in dimethylsulfoxide and a small amount of unreacted glycerol is present. By dissolving in HCl, adding potassium iodide, and titrating the liberated iodine with sodium thiosulfate, over 80 percent of the antimony is in the pentavalent state, the remainder being trivalent antimony.

I claim:

1. A method of producing an ester of antimony with a polyhydroxy compound containing two through six carbon atoms and having vicinal hydroxyl groups, at least a portion of the antimony being in the pentavalent state, which comprises oxidizing trivalent antimony oxide with concentrated aqueous nitric acid in the presence of hydrochloric acid to produce pentavalent antimony oxide or hydroxide or a mixture of trivalent and pentavalent antimony oxides or hydroxides, mixing said oxides or hydroxides with more than three moles of the polyhydroxy compound per mole of antimony, and heating the mixture to cause the oxides and hydroxides to react with a portion of the polyhydroxy compound, thus forming the antimony ester in which at least a portion of the antimony is in the pentavalent state in a solution of polyhydroxy compound.

2. Method of claim 1 wherein water liberated in reaction between the oxides or hydroxides and the polyhydroxy compound is removed continuously by distillation under reduced pressure as the reaction proceeds.

3. Method of claim 2 wherein the polyhydroxy compound is ethylene glycol.

4. Method of claim 2 comprising the further steps of removing the bulk of the excess unreacted polyhydroxy compound by distillation under reduced pressure to form a slurry of the pentavalent antimony ester or a solution containing the mixed esters in the remaining unreacted polyhydroxy compound, then adding to the slurry or solution a polar organic solvent characterized by a dielectric constant measured at 25° C. and $10^4$ to $10^5$ cycles per second which exceeds 35 electrostatic units and ratio of carbon atoms to heteroatoms less than 1.7, whereby there is formed a clear solution of said ester or mixed esters in said solvent.

5. Method of claim 4 wherein the solvent is selected from the group consisting of formic acid, formamide, methylformamide, dimethylformamide, acetamide, 1,3-propanediol, ethylene glycol, diethylene glycol, glycerol, and dimethylsulfoxide.

6. Method of claim 4 wherein the polyhydroxy compound is ethylene glycol and the solvent is dimethylformamide or dimethylsulfoxide.

7. Method of claim 2 wherein the oxidation is carried out at 25° to 122° C., the weight ratio of nitric acid to hydrochloric acid, calculated as 70 percent nitric acid and 37 percent hydrochloric acid, is in the range of 2:1 to 200:1, the mol ratio of nitric acid to antimony trioxide is at least 4:1, and the reaction with the polyhydroxy compound is carried out at 150° to 200° C.

8. Method of claim 4 wherein the oxidation is carried out at 25° to 122° C., the weight ratio of nitric acid to hydrochloric acid, calculated as 70 percent nitric acid and 37 percent hydrochloric acid, is in the range of 2:1 to 200:1, the mol ratio of nitric acid to antimony trioxide is at least 4:1, and the reaction with the polyhydroxy compound is carried out at 150° to 200° C.

9. Method of claim 8 wherein the polyhydroxy compound is ethylene glycol.

10. Method of claim 9 wherein the solvent is dimethylformamide or dimethylsulfoxide.

11. Method of claim 2 wherein sufficient antimony is oxidized to pentavalent state that the mole ratio of pentavalent antimony ester to trivalent antimony ester is greater than 2:1 and comprising the further steps of removing any undissolved solids from the solution by filtration, concentrating the solution by vaporization of the polyhydroxy compound under reduced pressure to give a slurry, then filtering the slurry whereby there is obtained a solid, crystalline pentavalent antimony ester of the polyhydroxy compound.

12. Method of claim 11 wherein the polyhydroxy compound used is ethylene glycol.

13. Method of claim 7 wherein sufficient antimony is oxidized to pentavalent state that the mole ratio of pentavalent antimony ester to trivalent antimony ester is greater than 2:1 and comprising the further steps of removing any undissolved solids from the solution by filtration, concentrating the solution by vaporization of the polyhydroxy compound under reduced pressure to give a slurry, then filtering the slurry whereby there is obtained a solid, crystalline pentavalent antimony ester of the polyhydroxy compound.

14. Method of claim 13 wherein the polyhydroxy compound used is ethylene glycol.

15. Method of claim 2 wherein the oxidation is carried out at 80° to 110° C., the weight ratio of nitric acid to hydrochloric acid, calculated as 70 percent nitric acid and 37 percent hydrochloric acid, is in the range of 10:1 to 50:1, the mole ratio of nitric acid to antimony trioxide is at least 4:1, and the reaction with the polyhydroxy compound is carried out at 160°–180° C.

16. Method of claim 15 wherein sufficient antimony is oxidized to pentavalent state that the mole ratio of pentavalent antimony ester to trivalent antimony ester is greater than 2:1 and comprising the further steps of removing any undissolved solids from the solution by filtration, concentrating the solution by vaporization of the polyhydroxy compound under reduced pressure to give a slurry, then filtering the slurry whereby there is obtained a solid, crystalline pentavalent antimony ester of the polyhydroxy compound.

17. Method of claim 16 wherein the slurry of pentavalent antimony ester is diluted with tetrahydrofuran prior to filtration and after filtration the filtered cake is washed with tetrahydrofuran and dried.

18. Method of claim 17 wherein the polyhydroxy compound is ethylene glycol.

* * * * *